United States Patent [19]

Suzuki

[11] 4,310,962

[45] Jan. 19, 1982

[54] METHOD OF AND APPARATUS FOR ATTACHING CONNECTING PIECES

[75] Inventor: Tadashi Suzuki, Saitama, Japan

[73] Assignee: Sato Gosei Co., Ltd., Tokyo, Japan

[21] Appl. No.: 111,087

[22] Filed: Jan. 10, 1980

[30] Foreign Application Priority Data

Sep. 26, 1979 [JP] Japan ................................ 54-123455

[51] Int. Cl.[3] .......................... B23P 17/00; B65C 5/06

[52] U.S. Cl. ........................................ 29/417; 29/241; 29/429; 29/433; 29/451; 227/67; 227/109

[58] Field of Search ................. 29/433, 450, 241, 417, 29/429, 451; 227/67, 97, 109, 120, 119

[56] References Cited

U.S. PATENT DOCUMENTS

| | | | |
|---|---|---|---|
| 3,650,451 | 3/1972 | Weiland et al. | 227/67 |
| 3,652,004 | 3/1972 | Lozio | 227/67 |
| 3,659,769 | 5/1972 | Bone | 227/68 |
| 3,759,435 | 9/1973 | Bone | 227/67 |
| 4,049,179 | 9/1977 | Jenkins | 227/67 |
| 4,187,970 | 2/1980 | Furutu | 227/67 X |

*Primary Examiner*—Paul A. Bell

*Attorney, Agent, or Firm*—Armstrong, Nikaido, Marmelstein & Kubovcik

[57] ABSTRACT

A method of and apparatus for attaching a connecting piece to objects to connect these objects to each other. The connecting pieces each having a filament portion, a head portion attached to one end of the filament portion and a cross-bar portion attached to the other end, are successively severed one by one by the attaching device from a continuous belt of connecting pieces formed integrally from a plastic and having a connecting rod to which the connecting pieces arranged in side-by-side relation are connected through respective connecting portions, and are then attached to the objects to connect them to each other. The improvement resides in a technic which ensures to correctly position the connecting piece to be severed to the severing position even when the connecting pieces in the connecting piece belt are disposed at an irregular pitch. This can be achieved by continuously pressing the connecting piece to be severed in the direction of feed of the belt until the connecting piece to be severed is stopped and located by a stopper member disposed in the severing position.

5 Claims, 4 Drawing Figures

METHOD OF AND APPARATUS FOR ATTACHING CONNECTING PIECES

BACKGROUND OF THE INVENTION

1. Field of the Invention

The present invention relates to a method of and device for attaching a connecting piece such as a tag pin which is used for connecting two members such as label or tag and an article of clothes to each other. More particularly, the invention is concerned with a method of and device for attaching a connecting piece by at first severing one by one a plurality of connecting pieces formed integrally in groups from a plastic, each group having a plurality of connecting pieces arranged in parallel relationship, and then attaching a severed connecting piece to an object, wherein the improvement resides in that the connecting pieces are successively fed to the severing position exactly even when the connecting pieces in the group are connected in an irregular pitch.

2. Description of the Prior Art

Recently, connecting pieces 1 made of a plastic as shown in FIG. 2 are used for connecting two members such as a label or tag and an article of clothes to each other. Each of the connecting pieces has a filament portion 1*c* to one end of which connected is a head portion 1*a*, while, to the other end, connected is a cross-bar portion 1*b*. The connecting pieces are formed integrally in the form of a belt or group 3 in which connecting pieces are connected to a common connecting rod 2 through respective connecting portions 1*d*. In use of the connecting pieces, the belt 3 is put into an attaching device which is adapted to severe connecting pieces successively one by one from the belt 3 and to attach the severed connecting piece 1 to two members such as a label or tag and an item of clothes thereby to connect these members to each other.

It is often experienced that, since the filament portion 1*c* is freely deflectable, the connecting pieces of a common belt 3 are inconveniently entangled with each other if the pitch P of the successive connecting pieces is too large. Also, when a multiplicity of belts 3 of connecting pieces are accomodated in a box or the like, the belts 3 are likely to be entangled with each other to hinder the attaching work.

These problems have been overcome, however, by reducing the pitch P of the connecting pieces to a size substantially equal to the thickness t of the head portion of the connecting piece. Consequently, the troubles attributable to the entanglement of the belts is eliminated to ensure a higher efficiency of the work. The reduction of the pitch P of the connecting pieces provides further advantages. For instance, the size of the mold for forming the belt is and, accordingly, the path leading to the cavity is shortened. In addition, the temperature spots of the mold is reduced to ensure the production of the belt of connecting pieces having no spot. Further, the forming pressure is decreased attributable to the shortening of the path to the mold cavity.

In the conventional attaching device for attaching the connecting piece, the arrangement is such that the belt 3 of the connecting pieces 1 is fed intermittently by each pitch by means of a gear of the same pitch as the pitch P of connecting pieces. Therefore, the conventional attaching device cannot be used for the belt 3 having connecting pieces disposed at such a small pitch. Another problem resides in that, for avoiding the feeding failure of connecting pieces, it is necessary to improve the pitch of the connecting pieces corresponding to the pitch of gear, so that the cavities of the mold for forming the belt or group 3 of connecting pieces have to be finished at an impractically high precision.

Further, the conventional attaching device can handle only the belt of connecting pieces which has been produced specifically for that attaching device and cannot operate with other belt. This is quite inconvenient from the user's point of view.

SUMMARY OF THE INVENTION

The present invention has been achieved under full consideration for overcoming the above described problems of the prior art.

It is, therefore, an object of the invention to provide a method of and apparatus capable of feeding connecting pieces such as tag pins to be severed at a severing position without fail even with the belts of various pitches of connecting pieces.

To this end, according to one aspect of the invention, there is provided a method of attaching a connecting piece for connecting two members to each other, the connecting pieces being severed one by one by an attaching device from a continuous belt or group of connecting pieces which is formed integrally from a plastic and in which a plurality of connecting pieces, each having a filament portion, a head portion connected to one end of the filament portion and a cross-bar portion connected to the other end of the filament section, are connected in parallel relationship by means of a connecting rod located outside said cross-bars and perpendicular to the filament portions, the severed connecting piece being attached by the attaching device to connect the two members to each other, characterized in that the connecting piece in the severing position is biased continuously and resiliently in the direction of feed of the belt of connecting pieces, over at least a period until the severed connecting piece is located upon abutment with a stopper of severing position of the attaching device.

According to another aspect of the invention, there is provided a device for attaching a connecting piece for connecting two members to each other, the device being adapted to severe said connecting piece one by one from a belt or group of connecting pieces which is formed integrally from a plastic and in which a plurality of connecting pieces, each having a filament portion, a head portion connected to one end of said filament portion and a cross-bar portion connected to the other end of the filament section, are connected in parallel relationship by means of a connecting rod located outside the cross-bar portion and perpendicular to the filament portion, the device being further adapted to attach the severed piece to said members, characterized by comprising: a stopper member disposed at a severing position at which said connecting pieces are severed one by one; and a connecting piece driving member which is adapted to bias the connecting pieces in the severing position continuously and resiliently in the direction of feed of said belt, over at least a period until the connecting piece to be severed is located upon abutment with the stopper member.

DESCRIPTION OF THE PREFERRED EMBODIMENTS

Figure 1:
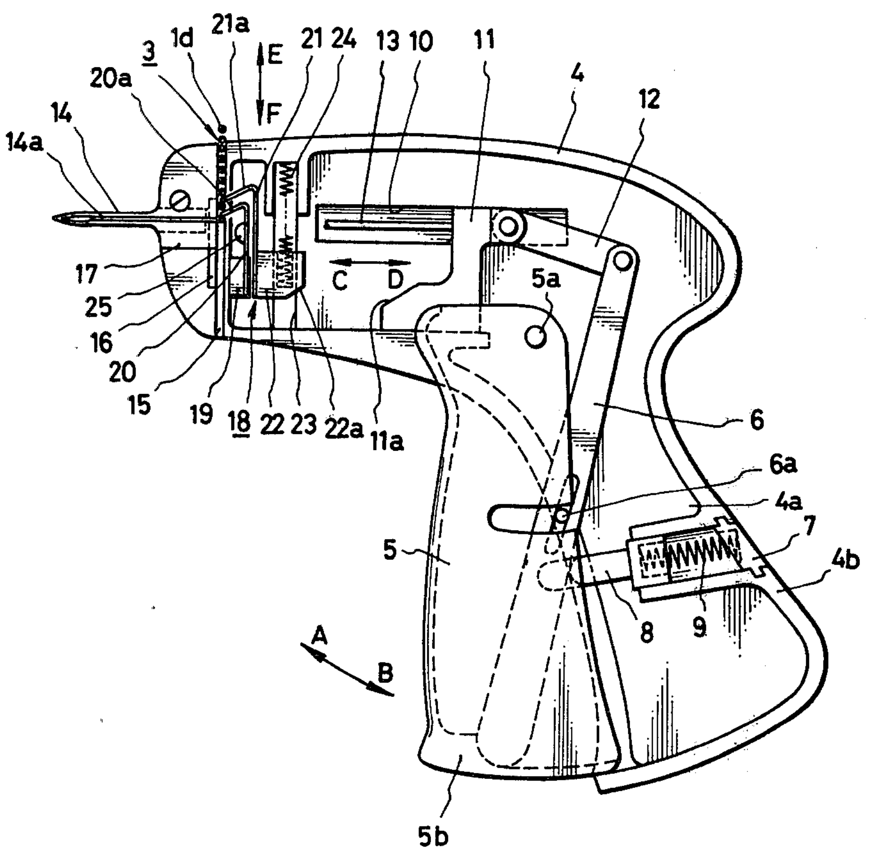
FIG. 1 is a front elevational view showing the inner structure of an attaching device in accordance with the invention.

Referring first to the attaching device for attaching the connecting piece, the attaching device has a main body 4 having a pistol-like form. The main body 4 is split into two halves along a thickness-wise bisector line. After mounting various mechanism in one of the halves as illustrated, the other half part is coupled to the first half to cover the mechanisms mounted in the latter.

The main body 4 has a grip 4*a* at the front part of which pivotally mounted is a lever 5 for swinging movement in the direction of an arrow A-B around a pivot shaft 5*a*. An operation link 6 adapted to be swung around a pivot shaft 6*a* together with the lever 5.

A spring retainer 7 is fitted to the rear wall 4*b* of the grip 4*a* of the main body 4, while a lever resetting member 8 abuts against the portion of the operation link 6 below the pivot shaft 6*a*. A compression coiled spring 9 is disposed to act between the spring retainer 7 and the lever resetting member 8 to normally bias the operation link 6 and the lever 5 in the direction of arrow A.

A guide groove 10 for slidably receiving and guiding a rod driving member 11 is formed in the upper part of the main body 4 to extend in the direction of arrow C-D. The rod driving member 11 is operatively connected to the operation link 6 through an intermediate link 12. The arrangement is such that the rod driving member 11 slides in the guide groove 10 in the direction of arrow C-D as the lever 5 is swung in the direction of arrow A-B.

A driver 13 for driving the end surface of the cross-bar portion 1*b* of the connecting piece is attached to the rod driving member 11. A guide needle 14 detachably secured to the front end portion of the main body 4 extends along the extension of the axis of the driver 13. The guide needle 14 is provided with a groove 14*a* through which the filament portion 1*c* of the connecting piece moves. A feed groove 15 for a belt or group of connecting pieces is formed in the portion of the main body 4 behind the guide needle 14, so as to extend substantially at a right angle to the axis of the guide needle 14.

Figure 2:
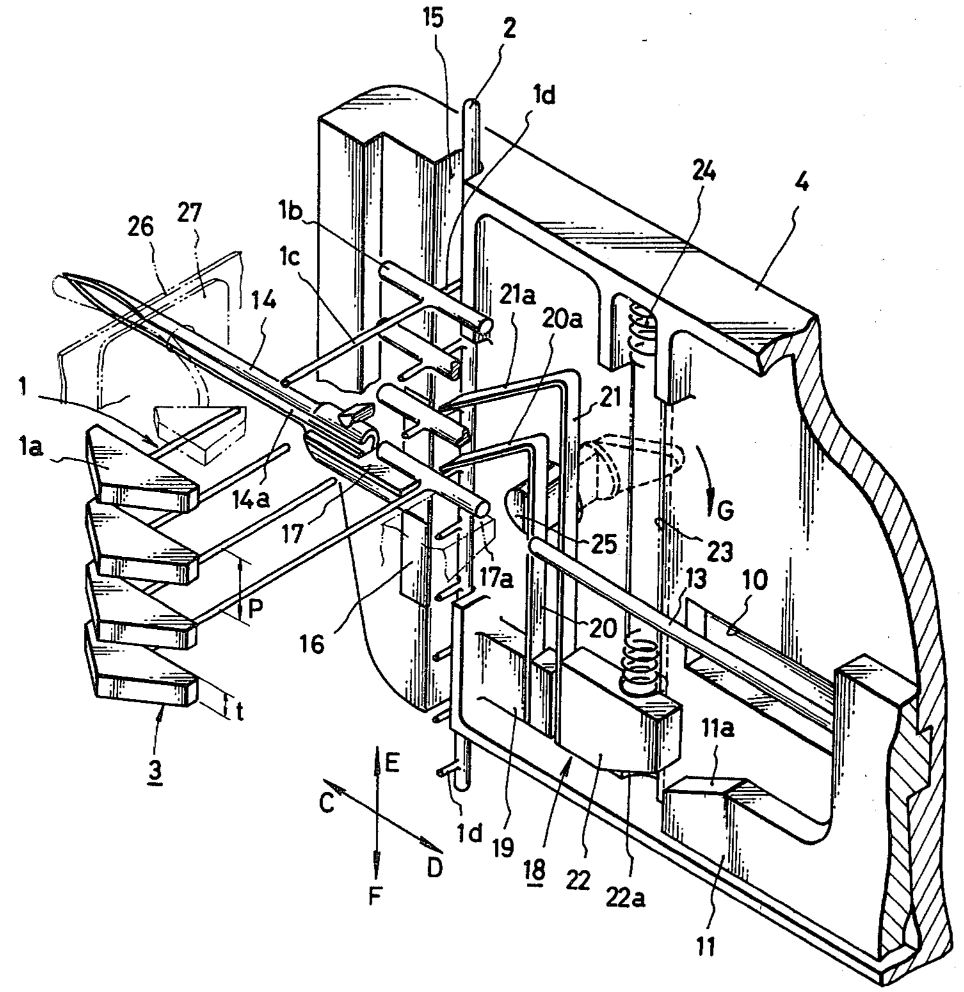
FIG. 2 is a perspective view of a part of the attaching device of the invention, showing particularly a feed mechanism.

As will be understood from FIG. 2, the corner of the feed groove 15 closer to the guide needle 14 is provided with a cutter 16 which is adapted to cut the belt of connecting pieces at a portion of the latter between the cross-bar portion 1*b* and a connecting portion 1*d* when the cross-bar portion 1*b* of connecting piece 1 is pressed by the driver 13. The position at which the connecting piece or tag pin 1 is severed from the belt 3 is so determined as to make the line interconnecting the axes of the guide needle 14 and the driver 13 coincide with the axes of the cross-bar portion 1*b* of the connecting piece 1 to be severed. To correctly locate the connecting piece at this position, a stopper projection 17 is formed to project from the main body 4 so as to receive the cross-bar portion 1*b*.

Also in FIG. 2 showing a feed mechanism 18 for feeding the connecting piece 1 to the severing position, a support member 19 is fixedly mounted in the main body 4 to which fixed is the rear end portion of a member 20 having a hooked front end 20*a*. The member 20 is provided for preventing the reverse movement of the belt 3 of the connecting pieces and is constituted by a leaf spring or made of a plastic having a good resiliency. The hooked front end portion 20*a* of the member 20 confronts the front side of the feed groove 15 so as to press the connecting portion 1*d* of the connecting piece 1.

Also, a connecting piece driving member 21 having the same shape as the member 20 is positioned at the outside of the member 20 for preventing the reversing of the belt 3. As is the case with the member 20, this connecting piece driving member 21 is constituted by a leaf spring or made of a plastic having a good resiliency. The front end portion 21*a* of the connecting piece drive member 21 confronts the front side of the feed groove 15 so as to press the connecting portion 1*d* of the connecting piece 1*d*. The connecting piece driving member 21 thus arranged is connected at its rear end to a movable feed member 22 which is adapted to be moved in the directions of arrows E-F being guided by a groove 23 of the main body 4. Normally, the movable feed member 22 is biased in the direction of arrow F by means of a coiled spring 24.

A tapered cam surface 22*a* is formed on the lower side of the movable feed member 22. Also, another tapered cam surface 11*a* is formed on the front part of the rod driving member opposing to the tapered cam surface 22*a*. The size and shape of the tapered cam surface are determined preferably such that these tapered cam surfaces 11*a*, 22*a* come to cooperate with each other to drive the movable feeding member 22 in the direction of arrow E at such a moment when the driver 13 drives the cross-bar portion 1*b* of the connecting member in the severing position and the connecting portion 1*d* is contacted by the cutter 16, and that the stroke of the movement of the movable member 22 is at least greater than the conceivable maximum pitch P of the connecting pieces.

Also, as will be seen from FIG. 2, a semicircular actuating member 25 is disposed to oppose to the front surface of the vertical portion of the member 20 for preventing the reversing of the belt. As the lever 5 of the actuating member 25 outside of the main body 4 is swung in the direction of arrow G, the member 20 for preventing the reversing moves in the direction of arrow D thereby to disengage the front end portions 20*a*, 21*a* of the members 20, 21 from the connecting portion 1*d* of the connecting piece belt 3.

Hereinafter, an explanation will be made as to how the connecting piece is attached to an object by the attaching device of the invention having the described construction.

First of all, the belt 3 of connecting pieces 1 is inserted into the feed groove 15 to bring the cross-bar 1*b* of a connecting piece 1 to be severed into abutment with the stopper projection 17. Then, after inserting the guide needle 14 into a plurality of objects 26,27 positioned in a superposed manner, as shown in FIG. 2. Then, the lever 5 is swung in the direction of arrow B so that the projection 5*b* of the lever 5 presses the lower end of the operation link 6 in the direction of arrow B. Consequently, the operation link 6 rotates around the pivot shaft 6*a* in the direction of arrow B. By so doing, the rod driving member 11 is moved in the direction of arrow C through the medium of the intermediate link 12. The driver 13 which is driven by the rod driving member 11 and moves in the same direction as the latter to come into contact with the cross-bar portion 1*b* of the connecting piece 1 to be severed, thereby to drive the connecting portion 1*d* of the same against the cutter 16.

At this moment, the tapered cam surface 11*a* of the rod driving member 11 engages the tapered cam surface 22*a* to lift the movable feed member 22 in the direction of arrow E.

As the driver 13 is moved further in the direction of arrow C from this position, the connecting portion 1*d* of the connecting piece 1 to be severed is cut by the cutter 16 and the cross-bar portion 1*d* is driven into the guide needle 14 to come out of the side of the objects 26,27 opposite to the attaching device. The cross-bar portion 1*d* of the severed connecting piece 1 is then disengaged from the guide needle 14 as shown by imaginary line in FIG. 2. Meanwhile, the connecting piece driving member 21 moves in the direction of arrow E over the connecting portion 1*d* of the connecting piece 1 which is still in the severing position, while the member 20 holds the connecting piece band 3 so that the latter may not move in the reverse direction, i.e., in the direction of arrow E.

After securing the connecting piece 1 to the objects 26, 27, the lever 5 is reset in the direction of arrow A of FIG. 1 by the action of the compressed coiled spring 9. Accordingly, the driver 13 and the rod driving member 11 are moved in the direction of arrow D.

Therefore, the movable feeding member 22 which has been raised in the direction of arrow E by the tapered cam surface 11*a* of the movable rod member 11 is gradually moved in the direction of arrow F by the action of the compressed coiled spring 24. As a result, the connecting piece driving member 21 presses the connecting portion 1*d* of the connecting piece 1 which is still out of the severing position, in the direction of arrow F. In this state, only the connecting portion 1*d* of the severed connecting piece 1 is left in the severing position, so that the connecting piece belt 3 as a whole can move in the direction of arrow F without encountering the interference of the stopper projection 17. Then, the next connecting piece 1 to be severed is stopped by the stopper projection so as to be located by the latter, and the connecting piece driving member 21 and the movable feeding member 22 hold their positions in a suspended state.

When the connecting member 1 is fed in the direction of arrow F by the connecting piece driving member 21 to bring the cross-bar portion 1*b* into abutment with the stopper projection 17, the cross-bar portion 1*b* may be inclined due to the pressure exerted in the direction of arrow F. Such an inclination, however, can be avoided by providing another stopper projection 17*a* on the other half (not shown) of the main body 4 as shown by an imaginary line, so that the cross-bar portion 1*d* can always be held on the common axis of the guiding needle 14 and the driver 13.

On the other hand, following the movement of the connecting piece belt 3 in the direction of arrow F, the member 20 for preventing the reversing of the belt 3 is once kicked outwardly by the connecting portion 1*d* moving in the direction of arrow F and is then reset to press the connecting portion 1*d*.

Since the connecting piece belt 3 is fed in the described manner, connecting pieces 1 can be advanced by a distance which is exactly the same as those of the pitch of the connecting pieces, even when the stroke of the connecting piece driving member 21 in the direction of arrow E is selected to be one to several times as large as the pitch of connecting pieces 1 which are still out of the severing position. More specifically, provided that the pitch of connecting pieces 1 in a connecting piece belt 3 is 2 mm, it is possible to exactly locate a next connecting piece to be severed in the severing position even when the pitch is fluctuated within the region of between 1 mm and 4 mm. It is, therefore, possible to sever the connecting pieces one by one even with a connecting piece belt of a random pitch of connecting pieces, or with different connecting piece belts having different pitches of connecting pieces.

Figure 3:
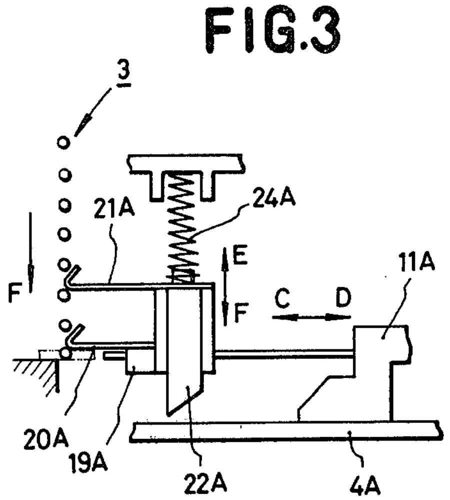
FIGS. 3 and 4 are front elevational views of different examples of the feed mechanism.

The connecting piece driving member 21A and the member 20A for preventing the reversing of the connecting piece belt may be formed to extend in the direction of arrow C as shown in FIG. 3. In this case, a support member 19A for the member 20A is attached to the main body 4A for free movement in the direction of arrows C-D. Also, the movable feeding member 22A is fitted to the support member 19A for free movement in the directions of arrow E-F, while the movable feeding member 22A is biased in the direction of arrow F by a compressed coiled spring 24A. Further, the movable feeding member 22A and the rod driving member 11A are provided with tapered cam surfaces such that the movement of the rod driving member 11A in the direction of arrow C causes a movement of the movable feeding member 22A, i.e., connecting piece driving member 21A, in the direction of arrow E thereby to feed the connecting piece belt 3 in the direction of arrow F by the force of the compressed coiled spring 24A. For disengaging the connecting piece driving member 21A and the member 20A for preventing the reversing of the connecting piece belt 3, the support member 19A is simply displaced in the direction of arrow D.

Figure 4:
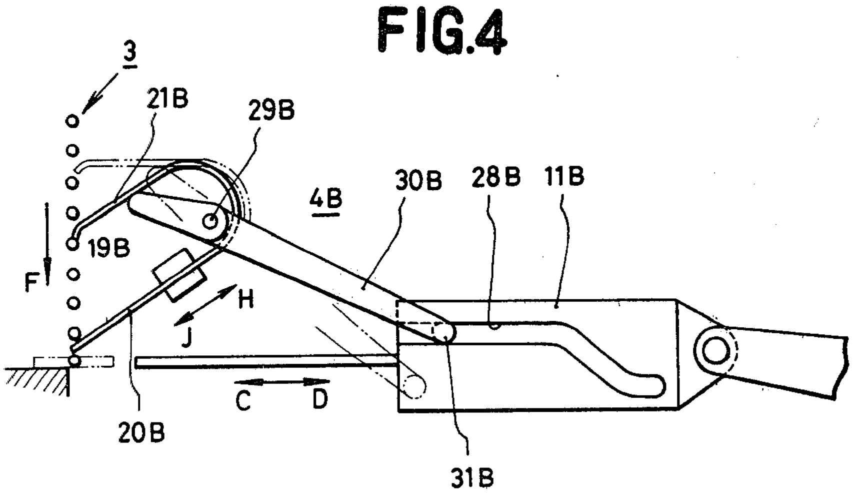

FIG. 4 shows another form of feed mechanism for feeding the belt 3 of connecting piece. In this mechanism, the connecting piece driving member 21B and the member 20B for preventing the reversing of the belt 3 are formed integrally with each other to present as a whole a substantially U-shaped form. The portion of this unitary body constituting the member 20B for preventing the reversing is fixed by means of a support member 19B. The support member 19B is attached to the main body 4B for free movement in the directions of arrow H-J. For disengaging the connecting piece driving member 21B and the member 20B for preventing the reversing, the support member 19B is moved in the direction of arrow H, while, for feeding the connecting piece belt 3 in the direction of arrow F, a cam groove 28B as illustrated is formed in the rod driving member 11A so as to receive one end 31B of a link 30B which is pivotally supported by the main body 4B at a pivot point 29B. The other end of the link 30B is made to contact the inside of the connecting piece driving member 21B.

In operation, the connecting piece driving member 21B is moved to the position of imaginary line as the rod driving member 11B is moved in the direction of arrow C. Also, the link 30B is returned from the position of full line to the position of broken line as the rod driving member 11B is moved in the direction of arrow D.

As a result, the freed connecting piece driving member 21B drives the connecting piece belt 3 in the direction of arrow F, kicking the member 20B for preventing reversing, due to its resiliency. This feeding mechanism is advantageous in that the number of parts is considerably decreased.

As has been described, according to the invention, it is possible to feed a connecting piece to be severed, from a position out of the severing position correctly to the severing position, by suitably hitching and pressing the connecting piece which is still out of the severing position.

Consequently, the attaching method and device of the invention make it possible to handle a connecting piece belt of an irregular pitch of connecting pieces and connecting piece belts having different pitches of connecting pieces.

What is claimed is:

1. In a method of attaching one of a plurality of connecting pieces to an article, each connecting piece having a filament (1*c*), a head portion (1*a*) connected to one end of the filament, a cross-bar portion (1*b*) connected to the other end of the filament, and a connecting portion (1*d*) connected to the cross-bar portion, the plurality of pieces being connected together in parallel relationship to each other to form a belt (3) by having each of the connecting portions be attached to a connecting rod (2) perpendicular to the filaments, which method comprises the successive steps of:

feeding, the belt downwardly (F) through an opening in a main body (4) of a device, inserting a hollow needle (14) which is mounted on the main body into the article, severing the connecting pieces, one at a time from the belt by driving the cross-bar portion with a driver (13) in a forward direction (C) perpendicular to the direction (F) of belt feed through the hollow needle (14) and into the article, and removing the hollow needle from the article leaving the severed connecting piece therein;

the improvement which comprises:

moving a connecting piece driving member (21) upwardly in a direction (E) opposite to the direction of belt feed to a position above the cross-bar portion of the next connecting piece in said belt by action of a rod driving member (11), said member having the driver (13) mounted thereon, simultaneously with the driving of the cross-bar portion while preventing the belt from moving upwardly by holding the belt with a holding member (20), and feeding the belt downwardly until a cross-bar portion contacts a stopper projection (17) formed at the rear of the needle by returning the connecting piece driving member to its original position upon retraction of the rod driving member (11) and the driver (13).

2. In an attaching device for attaching one of a plurality of connecting pieces (1) to an article, each connecting piece having a filament (1*c*), a head portion (1*a*) connected to one end of the filament, a cross-bar portion (1*b*) connected to the other end of the filament, and a connecting portion (1*d*) connected to the cross-bar portion, the plurality of pieces being connected together in parallel relationship to each other to form a belt (3) by having each of the connecting portions be attached to a connecting rod (2) perpendicular to the filaments, which device comprises:

a main body (4) having a feed groove (15) for the belt formed therein, a hollow needle (14) mounted on the main body having a rear end and an axis, the rear end being mounted adjacent the feed groove with the axis perpendicular to the feed groove, and a driver (13) operatively mounted in the main body to sever the connecting pieces one at a time from the belt and drive the cross-bar portion of the severed connecting piece through the needle, the improvement wherein the device further comprises:

a stopper projection (17) formed at the rear end of the needle, a holding member (20) mounted in the main body preventing the belt from moving upwardly in the feed groove, the holding member having a forward end portion in the feed groove proximate to the stopper projection, a connecting-piece driving member (21) disposed in said main body substantially parallel to the holding member (20), the driving member having a forward end portion located in the feed groove above the forward end portion of the driving member, a movable feed member (22) mounted slidably in a groove in the main body, the movable feed member having the connected piece driving member affixed thereto, a spring (24) mounted in said main body, biasing the movable feed member in a downwards feed direction (F) for the belt (3), and a rod driving member (11) in the main body carrying the driver (13) adapted to drive the movable feed member (22) against the force of the spring (24) in the direction (E) opposite the feed direction.

3. An attaching device as claimed in claim 2, wherein the stopper projection (17) is adapted to support the cross-bar portion (1*b*) of the connection pieces (1).

4. An attaching device as claimed in claim 3, wherein the connecting-piece driving member (21, 21B) and the holding member (20, 20B) are connected together in a U-shape, the holding member (20B) being supported by a support member (19B), the connecting-piece driving member (21B) being moved to rise and fall by a link (30B) pivotable about a pivot point (29B) fixed to the main body (4).

5. An attaching device as claimed in claim 2 or 4, wherein the holding member (20, 20B) and the connecting-piece driving member (21, 21B) are formed of a leaf spring material.

* * * * *